US008969476B2

(12) United States Patent
Berzinis et al.

(10) Patent No.: US 8,969,476 B2
(45) Date of Patent: Mar. 3, 2015

(54) IMPACT-MODIFIED COMPOSITIONS (75) Inventors: Albin Peter Berzinis, Marietta, OH (US); James Edward Pickett, Schenectady, NY (US)

(73) Assignee: Sabic Global Technologies B.V. (NL)

( * ) Notice: Subject to any disclaimer, the term of this patent is extended or adjusted under 35 U.S.C. 154(b) by 1459 days.

(21) Appl. No.: 11/260,711

(22) Filed: Oct. 27, 2005

(65) Prior Publication Data

US 2006/0069210 A1 Mar. 30, 2006

Related U.S. Application Data (63) Continuation-in-part of application No. 10/464,975, filed on Jun. 19, 2003, now abandoned.

(60) Provisional application No. 60/390,711, filed on Jun. 21, 2002.

(51) Int. Cl.
*C08L 25/12* (2006.01)
*C08L 51/00* (2006.01)
*C08F 265/04* (2006.01)

(52) U.S. Cl.
CPC .................................. *C08F 265/04* (2013.01)
USPC .................................. 525/71; 525/80; 525/86

(58) Field of Classification Search
USPC .......................................... 525/71, 80, 86, 70
See application file for complete search history.

(56) References Cited

U.S. PATENT DOCUMENTS

| | | | |
|---|---|---|---|
| 2,991,273 A | 7/1961 | Hechelhammer et al. | |
| 2,999,835 A | 9/1961 | Goldberg | |
| 3,028,365 A | 4/1962 | Schnell et al, | |
| 3,148,172 A | 9/1964 | Fox | |
| 3,153,008 A | 10/1964 | Fox | |
| 3,271,367 A | 9/1966 | Schnell et al., | |
| 3,271,368 A | 9/1966 | Goldberg et al. | |
| 3,944,631 A | 3/1976 | Yu et al. | |
| 4,111,876 A | 9/1978 | Bailey et al. | |
| 4,217,438 A | 8/1980 | Brunelle et al. | |
| 4,224,419 A | 9/1980 | Swoboda et al. | |
| 4,351,921 A | 9/1982 | Kishida et al. | |
| 4,415,708 A | 11/1983 | Matsumura et al. | |
| 4,556,692 A | 12/1985 | Kishida et al. | |
| 4,567,233 A | 1/1986 | Tomono et al. | |
| 4,584,344 A * | 4/1986 | Baer ............................... | 525/66 |
| 4,634,734 A | 1/1987 | Hambrecht et al. | |
| 4,690,977 A * | 9/1987 | Hosoi et al. ...................... | 525/83 |
| 4,696,973 A * | 9/1987 | Kamata et al. .................. | 525/71 |
| 4,753,988 A * | 6/1988 | Henton et al. ................... | 525/73 |
| 4,785,051 A * | 11/1988 | Henton ............................ | 525/71 |
| 4,788,253 A | 11/1988 | Hambrecht et al. | |
| 4,851,314 A | 7/1989 | Yoshihara | |
| 4,870,131 A * | 9/1989 | Pisipati et al. .................. | 525/74 |
| 4,880,875 A | 11/1989 | Wassmuth et al. | |
| 4,888,387 A | 12/1989 | Wada et al. | |
| 4,902,745 A * | 2/1990 | Piejko et al. ..................... | 525/80 |
| 5,047,473 A | 9/1991 | Piejko et al. | |
| 5,068,285 A | 11/1991 | Laughner | |
| 5,112,895 A | 5/1992 | Chen et al. | |
| 5,196,480 A | 3/1993 | Seitz et al. | |
| 5,264,492 A * | 11/1993 | Demirors ....................... | 525/193 |
| 5,326,793 A | 7/1994 | Gallucci et al. | |
| 5,334,658 A * | 8/1994 | Blumenstein et al. .......... | 525/71 |
| 5,580,924 A | 12/1996 | Wildi et al. | |
| 5,658,984 A | 8/1997 | Ishii et al. | |
| 5,821,302 A | 10/1998 | Rosenau et al. | |
| 5,840,803 A | 11/1998 | Chang et al. | |
| 5,955,540 A | 9/1999 | Dion et al. | |
| 5,965,665 A | 10/1999 | Fukuyama et al. | |
| 5,985,997 A * | 11/1999 | Bowen et al. ................... | 525/71 |
| 5,990,239 A | 11/1999 | Chang et al. | |
| 6,017,665 A | 1/2000 | Grune et al. | |

(Continued)

FOREIGN PATENT DOCUMENTS

| | | |
|---|---|---|
| EP | 0842981 A2 | 6/1998 |
| EP | 0913408 A2 | 5/1999 |

(Continued)

OTHER PUBLICATIONS

STN AN 1998:22892, abstracting JP 62199645, Sep. 1987.*
Inernational Search Report for Intnerational Application No. PCT/US2003/20956, Inernational filing date Jun. 20, 2003. Issued 131 Oct. 2003 (6 pages).
International Search Report for International Application No. PCT/US2004/014343, International filling date Jul. 5, 2004; Issued date Oct. 12, 2004 (6 pages).

(Continued)

*Primary Examiner* — Jeffrey Mullis
(74) *Attorney, Agent, or Firm* — Cantor Colburn LLP (57) ABSTRACT In one of its aspects the invention is directed to rubber modified thermoplastic resin compositions comprising discontinuous elastomeric phase particles derived from a unitary rubber substrate having at least a bimodal particle size distribution, wherein the elastomeric phase particles comprise a polymer having structural units derived from at least one ($C_1$-$C_{12}$) alkyl(meth)acrylate monomer and are dispersed in a rigid thermoplastic phase, wherein at least a portion of the rigid thermoplastic phase is grafted as a shell to elastomeric phase core particles, and wherein the rigid thermoplastic phase comprises structural units derived from at least one vinyl aromatic monomer, at least one monoethylenically unsaturated nitrile monomer and at least one ($C_1$-$C_{12}$)alkyl- or aryl-(meth)acrylate monomer. In another aspect the rigid thermoplastic phase of the compositions comprises a first thermoplastic phase at least a portion of which is grafted to the elastomeric phase; and a second thermoplastic phase comprising a polymer prepared separately in the absence of elastomeric phase and added to the composition.

10 Claims, 2 Drawing Sheets

(56) References Cited

U.S. PATENT DOCUMENTS

| | | | |
|---|---|---|---|
| 6,063,844 A | 5/2000 | Barren et al. | |
| 6,331,580 B1 | 12/2001 | Molnar | |
| 6,528,583 B1 * | 3/2003 | Chen et al. | 525/71 |
| 6,566,457 B2 | 5/2003 | Barghoorn et al. | |
| 6,683,133 B1 | 1/2004 | Gorrissen et al. | |
| 6,716,916 B1 | 4/2004 | Sun et al. | |
| 6,720,386 B2 | 4/2004 | Gaggar et al. | |
| 6,767,964 B2 | 7/2004 | Eichenauer et al. | |
| 6,806,315 B2 | 10/2004 | Shin et al. | |
| 7,019,049 B1 | 3/2006 | Yoo et al. | |
| 2003/0114597 A1 * | 6/2003 | Lee et al. | 525/242 |
| 2003/0236350 A1 * | 12/2003 | Berzinis et al. | 525/71 |
| 2004/0225034 A1 | 11/2004 | Berzinis | |
| 2004/0225069 A1 | 11/2004 | Berzinis et al. | |
| 2005/0171297 A1 | 8/2005 | Koevoets et al. | |

FOREIGN PATENT DOCUMENTS

| | | | |
|---|---|---|---|
| JP | 5233656 A | 8/1977 | |
| JP | 56-086918 A | 7/1981 | |
| JP | 59108056 A | 6/1984 | |
| JP | 62151442 A | 7/1987 | |
| JP | 62167348 A | 7/1987 | |
| JP | 62177054 A | 8/1987 | |
| JP | 62199645 A | 9/1987 | |
| JP | 63-120716 A | 5/1988 | |
| JP | 0425555 A | 1/1992 | |
| JP | 0841286 A | 2/1996 | |
| JP | 08134312 A | 5/1996 | |
| JP | 08134316 A | 5/1996 | |
| JP | 09216980 A | 8/1997 | |
| JP | 09249792 A | 9/1997 | |
| JP | 09272783 A | 10/1997 | |
| JP | 11240925 A | 9/1999 | |
| JP | 200140160 A | 2/2001 | |
| JP | 2002146149 A | 5/2002 | |
| WO | 9405716 A1 | 3/1994 | |
| WO | 9832796 A1 | 7/1998 | |
| WO | 0064978 A1 | 11/2000 | |
| WO | 0236688 A2 | 5/2002 | |

OTHER PUBLICATIONS

Written Opinion for International Application No. PCT/US2004/014343, International filing date May 7, 2004. Issued Oct. 12, 2004 (4 pages).

* cited by examiner

IMPACT-MODIFIED COMPOSITIONS

CROSS-REFERENCE TO RELATED APPLICATIONS

This application is a continuation-in-part of application Ser. No. 10/464,975, filed Jun. 19, 2003 now abandoned, which is incorporated herein by reference. This application claims priority of U.S. provisional application Ser. No. 60/390,711, filed Jun. 21, 2002, which is incorporated herein by reference.

BACKGROUND

For reasons of an excellent balance of impact strength, flow and chemical resistance a wide variety of commercial rubber-modified blends are based on styrene-acrylonitrile (SAN) copolymers. The widest commercial utility of such products is found when the rubber impact modifier phase is polybutadiene (PBD) to create the family of resins known as ABS. in order to improve the retention of impact strength and appearance upon outdoor exposure, styrene-acrylonitrile compositions comprising at least one alkyl acrylate, such as poly(butyl acrylate) (PBA) rubbers, are prepared, known as ASA (acrylonitrile-styrene-acrylate).

However, the styrene-acrylonitrile matrix polymers are significantly less stable to conditions of outdoor exposure than the PBA rubber substrate, since the styrenic structural units are more prone to photo-oxidation. Thus, systems based on styrene-acrylonitrile including ASA tend to show a tendency over time towards yellowing and chalking of the surface when exposed to actual or simulated outdoor exposure. It is well known in the art that hindered amine light stabilizers (HALS) may be added to resinous compositions in an attempt to retard the undesirable photochemistry. However, at some point the HALS is consumed at the surface of the article and yellowing can then ensue with further outdoor exposure. Thus, even ASA systems based on the more stable PBA rubber and containing HALS still show some degree of color shift and gloss loss during outdoor exposure.

By contrast, the class of impact-modified blends based on poly(methyl methacrylate) (PMMA) as the continuous rigid phase and an impact modifier based on a weatherable PBA rubber are well-recognized for showing minimal shift in color on exposure to real or simulated outdoor aging and also excellent retention of surface gloss under the same conditions. However, these blends are also often characterized by relatively low impact strength and stiff flow. A problem to be solved is to prepare compositions having the impact strength and other beneficial properties associated with compositions comprising styrene-acrylonitrile matrix polymers while obtaining the improved weatherability properties associated with compositions comprising PMMA.

Japanese patent 52-33656 to Mitsubishi Rayon discloses compositions wherein PMMA is grafted to impact modifier phase and is also a component of the rigid phase. However, these compositions do not display an optimum combination of impact, weatherability and gloss retention.

BRIEF DESCRIPTION

The present invention relates to rubber modified thermoplastic resins which show good initial aesthetics and excellent color and gloss retention after weathering, yet retain an attractive balance of good melt flow and excellent impact strength.

In one of its aspects the invention is directed to a rubber modified thermoplastic resin composition comprising discontinuous elastomeric phase particles derived from a unitary rubber substrate having at least a bimodal particle size distribution, wherein the elastomeric phase particles comprise a polymer having structural units derived from at least one $(C_1-C_{12})$alkyl(meth)acrylate monomer and are dispersed in a rigid thermoplastic phase, wherein at least a portion of the rigid thermoplastic phase is grafted as a shell to elastomeric phase core particles, and wherein the rigid thermoplastic phase comprises structural units derived from at least one vinyl aromatic monomer, at least one monoethylenically unsaturated nitrile monomer and at least one $(C_1-C_{12})$alkyl- or aryl-(meth)acrylate monomer.

In another of its aspects the present invention is directed to a rubber modified thermoplastic resin composition comprising about 20 to about 94 wt. % based on the total weight of the resin composition of discontinuous elastomeric phase particles derived from a unitary rubber substrate having at least a bimodal particle size distribution, wherein the elastomeric phase particles comprise a polymer having structural units derived from butyl acrylate and are dispersed in a rigid thermoplastic phase, wherein the unitary rubber substrate comprises a first mean particle size of less than about 160 nm and a second mean particle size in a range of between about 200 nm and about 750 nm, wherein at least a portion of the rigid thermoplastic phase is grafted as a shell to elastomeric phase core particles, and wherein the thermoplastic phase comprises structural units derived from methyl methacrylate and either styrene and acrylonitrile, or alpha-methyl styrene and acrylonitrile or a mixture of styrene, alpha-methyl styrene and acrylonitrile In another of its aspects the present invention is directed to a rubber modified thermoplastic resin composition comprising a discontinuous elastomeric phase dispersed in a rigid thermoplastic phase, wherein the elastomeric phase comprises particles comprising a polymer having structural units derived from at least one $(C_1-C_{12})$alkyl(meth)acrylate monomer and further comprises less than about 1 weight % of structural units derived from polymerization of monoethylenically unsaturated carboxylic acids, and wherein the rigid thermoplastic phase comprises a first thermoplastic phase at least a portion of which is grafted as a shell to elastomeric phase core particles; and a second thermoplastic phase comprising a polymer prepared separately in the absence of elastomeric phase and subsequently added to the composition, wherein the first thermoplastic phase comprises structural units derived from at least one vinyl aromatic monomer, at least one monoethylenically unsaturated nitrile monomer and at least one $(C_1-C_{12})$alkyl- or aryl-(meth)acrylate monomer; and wherein the polymer of the second thermoplastic phase comprises structural units derived from at least one vinyl aromatic monomer and at least one monoethylenically unsaturated nitrile monomer.

Various other features, aspects, and advantages of the present invention will become more apparent with reference to the following description and appended claims.

DETAILED DESCRIPTION

In one embodiment the present invention is directed to a rubber modified thermoplastic resin comprising a discontinuous elastomeric phase and a rigid thermoplastic phase wherein at least a portion of the rigid thermoplastic phase is grafted to the elastomeric phase. Grafted rigid thermoplastic phase is sometimes referred to as the "shell" and the discontinuous elastomeric phase is sometimes referred to as the "core" in such compositions. The cores in the compositions are derived from at least one rubber substrate which is susceptible to grafting with polymerizable monomers. In particular embodiments the rubber substrate comprises the discontinuous elastomeric phase and, hence, the core particles of the composition. There is no particular limitation on the rubber substrate provided it is susceptible to grafting by at least a portion of a graftable monomer. The rubber substrate has a glass transition temperature, Tg, in one embodiment below about 0° C., in another embodiment below about minus 20° C., and in still another embodiment below about minus 30° C.

In various embodiments the rubber substrate is derived from polymerization by known methods of at least one monoethylenically unsaturated alkyl (meth)acrylate monomer selected from ($C_1$-$C_{12}$)alkyl(meth)acrylate monomers and mixtures comprising at least one of said monomers. As used herein, the terminology "monoethylenically unsaturated" means having a single site of ethylenic unsaturation per molecule, and the terminology "(meth)acrylate monomers" refers collectively to acrylate monomers and methacrylate monomers. As used herein, the terminology "($C_x$-$C_y$)", as applied to a particular unit, such as, for example, a chemical compound or a chemical substituent group, means having a carbon atom content of from "x" carbon atoms to "y" carbon atoms per such unit. For example, "($C_1$-$C_{12}$)alkyl" means a straight chain, branched or cyclic alkyl substituent group having from 1 to 12 carbon atoms per group and includes, but is not limited to, methyl, ethyl, n-propyl, iso-propyl, n-butyl, sec-butyl, t-butyl, pentyl, hexyl, cyclohexyl, heptyl, octyl, nonyl, decyl, undecyl and dodecyl. Suitable ($C_1$-$C_{12}$)alkyl (meth)acrylate monomers include, but are not limited to, ($C_1$-$C_{12}$)alkyl acrylate monomers, illustrative examples of which include ethyl acrylate, butyl acrylate, iso-pentyl acrylate, n-hexyl acrylate, and 2-ethyl hexyl acrylate; and their ($C_1$-$C_{12}$)alkyl methacrylate analogs illustrative examples of which include methyl methacrylate, ethyl methacrylate, propyl methacrylate, iso-propyl methacrylate, butyl methacrylate, hexyl methacrylate, and decyl methacrylate. In a particular embodiment of the present invention the rubber substrate comprises structural units derived from n-butyl acrylate.

In various embodiments the rubber substrate may also comprise structural units derived from at least one polyethylenically unsaturated monomer. As used herein, the terminology "polyethylenically unsaturated" means having two or more sites of ethylenic unsaturation per molecule. A polyethylenically unsaturated monomer is often employed to provide cross-linking of the rubber particles and to provide "graftlinking" sites in the rubber substrate for subsequent reaction with grafting monomers. Suitable polyethylenic unsaturated monomers include, but are not limited to, butylene diacrylate, divinyl benzene, butane diol dimethacrylate, trimethylolpropane tri(meth)acrylate, allyl methacrylate, diallyl methacrylate, diallyl maleate, diallyl fumarate, diallyl phthalate, triallyl methacrylate, triallylisocyanurate, triallylcyanurate, the acrylate of tricyclodecenylalcohol and mixtures comprising at least one of such monomers. In a particular embodiment the rubber substrate comprises structural units derived from triallylcyanurate.

In some embodiments the rubber substrate may optionally comprise structural units derived from minor amounts of other unsaturated monomers, for example those that are copolymerizable with an alkyl (meth)acrylate monomer used to prepare the rubber substrate. Suitable copolymerizable monomers include, but are not limited to, $C_1$-$C_{12}$ aryl or haloaryl substituted acrylate, $C_1$-$C_{12}$ aryl or haloaryl substituted methacrylate, or mixtures thereof; monoethylenically unsaturated carboxylic acids, such as, for example, acrylic acid, methacrylic acid, crotonic acid and itaconic acid; glycidyl (meth)acrylate, hydroxy alkyl (meth)acrylate, hydroxy ($C_1$-$C_{12}$)alkyl (meth)acrylate, such as, for example, hydroxyethyl methacrylate; ($C_4$-$C_{12}$)cycloalkyl (meth)acrylate monomers, such as, for example, cyclohexyl methacrylate; (meth)acrylamide monomers, such as, for example, acrylamide, methacrylamide and N-substituted-acrylamide or -methacrylamides; maleimide monomers, such as, for example, maleimide, N-alkyl maleimides, N-aryl maleimides and haloaryl substituted maleimides; maleic anhydride; vinyl methyl ether, vinyl esters, such as, for example, vinyl acetate and vinyl propionate. As used herein, the term "(meth)acrylamide" refers collectively to acrylamides and methacrylamides. Suitable copolymerizable monomers also include, but are not limited to, vinyl aromatic monomers, such as, for example, styrene and substituted styrenes having one or more alkyl, alkoxy, hydroxy or halo substituent groups attached to the aromatic ring, including, but not limited to, alpha-methyl styrene, p-methyl styrene, 3,5-diethylstyrene, 4-n-propylstyrene, vinyl toluene, alpha-methyl vinyltoluene, vinyl xylene, trimethyl styrene, butyl styrene, t-butyl styrene, chlorostyrene, alpha-chlorostyrene, dichlorostyrene, tetrachlorostyrene, bromostyrene, alpha-bromostyrene, dibromostyrene, p-hydroxystyrene, p-acetoxystyrene, methoxystyrene and vinyl-substituted condensed aromatic ring structures, such as, for example, vinyl naphthalene, vinyl anthracene, as well as mixtures of vinyl aromatic monomers and monoethylenically unsaturated nitrile monomers such as, for example, acrylonitrile, ethacrylonitrile, methacrylonitrile, alpha-bromoacrylonitrile and alpha-chloro acrylonitrile. Substituted styrenes with mixtures of substituents on the aromatic ring are also suitable. In one particular embodiment of the invention the rubber substrate is essentially free of any structural units derived from adding to the polymerization mixture any monoethylenically unsaturated carboxylic acids, such as, for example, acrylic acid, methacrylic acid, crotonic acid and itaconic acid. In the present context "essentially free of" means that any monoethylenically unsaturated carboxylic acids are present in monomers employed in synthesis of the rubber substrate only as adventitious impurities, typically at a level of less than about 1 wt. % or less than about 0.5 wt. % or less than about 0.2 wt. %. In other embodiments the rubber substrate is essentially free of structural units derived from butadiene.

The rubber substrate may be present in compositions of the invention in one embodiment at a level of from about 10 to about 94 percent by weight; in another embodiment at a level of from about 15 to about 94 percent by weight; in another embodiment at a level of from about 20 to about 94 percent by weight; in another embodiment at a level of from about 30 to about 80 percent by weight; in another embodiment at a level of from about 35 to about 80 percent by weight; in another embodiment at a level of from about 40 to about 80 percent by weight; in another embodiment at a level of from about 25 to about 60 percent by weight, and in still another embodiment at a level of from about 40 to about 50 percent by weight based on the total weight of the composition. In other embodiments the rubber substrate may be present in compositions of the invention at a level of from about 5 to about 50 percent by weight; at a level of from about 8 to about 40 percent by weight; or at a level of from about 10 to about 30 percent by weight based on the total weight of the composition.

In particular embodiments of the invention the discontinuous elastomeric phase particles are derived from a unitary rubber substrate. In the present context a unitary rubber substrate means that any imaginary line drawn from a point on a substrate particle's surface through the particle to a point on the surface of the opposite side of the particle will encounter only the rubber substrate and optionally any adventitious material from which the rubber substrate was derived. In some embodiments the rubber substrate may possess a broad particle size distribution with particles ranging in size from about 50 nm to about 1000 nm. In other embodiments the mean particle size of the rubber substrate may be less than about 160 nm or less than about 100 nm. In still other embodiments the mean particle size of the rubber substrate may be in a range of between about 80 nm and about 400 nm. In still other embodiments the mean particle size of the rubber substrate may be in a range of between about 200 nm and about 750 nm. In other embodiments the mean particle size of the rubber substrate may be greater than about 400 nm. In some embodiments compositions of the invention may comprise discontinuous elastomeric phase particles derived from mixtures of at least two rubber substrates with different mean particle sizes. In other embodiments compositions of the invention may comprise discontinuous elastomeric phase particles derived from a unitary rubber substrate having at least a bimodal particle size distribution. In still other embodiments compositions of the invention may comprise discontinuous elastomeric phase particles having at least a bimodal particle size distribution and derived from mixtures of at least two rubber substrates with different mean particle sizes.

In one aspect of the present invention monomers are polymerized in the presence of the rubber substrate to thereby form a graft copolymer, at least a portion of which is chemically grafted to the rubber phase. Any portion of graft copolymer not chemically grafted to rubber substrate comprises the rigid thermoplastic phase. The rigid thermoplastic phase comprises a thermoplastic polymer or copolymer that exhibits a glass transition temperature (Tg) in one embodiment of greater than about 25° C., in another embodiment of greater than or equal to 90° C., and in still another embodiment of greater than or equal to 100° C.

In a particular embodiment the rigid thermoplastic phase comprises a polymer having structural units derived from one or more monomers selected from the group consisting of $(C_1\text{-}C_{12})$alkyl- and aryl-(meth)acrylate monomers, vinyl aromatic monomers and monoethylenically unsaturated nitrile monomers. Suitable $(C_1\text{-}C_{12})$alkyl- and aryl-(meth)acrylate monomers, vinyl aromatic monomers and monoethylenically unsaturated nitrile monomers include those set forth hereinabove in the description of the rubber substrate. Examples of such polymers include, but are not limited to, a styrene/acrylonitrile copolymer, an alpha-methylstyrene/acrylonitrile copolymer, a styrene/methylmethacrylate copolymer, a styrene/N-aryl maleimide copolymer, a styrene/N-phenyl maleimide copolymer, an alpha-methylstyrene/styrene/acrylonitrile terpolymer, a styrene/acrylonitrile/methylmethacrylate terpolymer, a styrene/acrylonitrile/acrylic acid terpolymer, or an alpha-methylstyrene/styrene/acrylonitrile terpolymer. These copolymers may be used for the rigid thermoplastic phase either individually or as mixtures.

In some embodiments the rigid thermoplastic phase comprises one or more vinyl aromatic polymers. Suitable vinyl aromatic polymers comprise at least about 20 wt. % structural units derived from one or more vinyl aromatic monomers. In a particular embodiment the rigid thermoplastic phase comprises a vinyl aromatic polymer having first structural units derived from one or more vinyl aromatic monomers and having second structural units derived from one or more monoethylenically unsaturated nitrile monomers. Examples of such vinyl aromatic polymers include, but are not limited to, a styrene/acrylonitrile copolymer, an alpha-methylstyrene/acrylonitrile copolymer, or an alpha-methylstyrene/styrene/acrylonitrile terpolymer. In another particular embodiment the rigid thermoplastic phase comprises a vinyl aromatic polymer having first structural units derived from one or more vinyl aromatic monomers; second structural units derived from one or more monoethylenically unsaturated nitrile monomers; and third structural units derived from one or more monomers selected from the group consisting of $(C_1\text{-}C_{12})$alkyl- and aryl-(meth)acrylate monomers. Examples of such vinyl aromatic polymers include, but are not limited to, styrene/acrylonitrile/methyl methacrylate copolymer and alpha-methylstyrene/acrylonitrile/methyl methacrylate copolymer. These copolymers may be used for the rigid thermoplastic phase either individually or as mixtures.

When structural units in polymers in the rigid thermoplastic phase are derived from one or more monoethylenically unsaturated nitrile monomers, then the nitrile monomer content in the copolymer comprising the graft copolymer and the rigid thermoplastic phase may be in one embodiment in a range of between about 5 and about 40 percent by weight, in another embodiment in a range of between about 5 and about 30 percent by weight, in another embodiment in a range of between about 10 and about 30 percent by weight, and in yet another embodiment in a range of between about 15 and about 30 percent by weight, based on the weight of the copolymer comprising the graft copolymer and the rigid thermoplastic phase.

When structural units in polymers in the rigid thermoplastic phase are derived from monomers comprising at least one $(C_1\text{-}C_{12})$alkyl- and aryl-(meth)acrylate monomer, then the wt./wt. ratio of said (meth)acrylate monomer to the totality of other monomers from which said rigid thermoplastic phase is derived is in one embodiment in a range of between about 10:1 and about 1:10; in another embodiment in a range of between about 8:1 and about 1:8; in another embodiment in a range of between about 5:1 and about 1:5; in another embodiment in a range of between about 3:1 and about 1:3; in another embodiment in a range of between about 2:1 and about 1:2; and in yet another embodiment in a range of between about 1.5:1 and about 1:1.5. In particular embodiments when at least one $(C_1\text{-}C_{12})$alkyl- or aryl-(meth)acrylate monomer, at least one vinyl aromatic monomer, and optionally at least one monoethylenically unsaturated nitrile monomer are employed as monomers in the rigid thermoplastic phase, the wt./wt. ratio of said monomers is, respectively, in one embodiment in a range of from about 80/20/0 to about 20/60/20, in another embodiment in a range of from about 60/30/10 to about 45/30/25, and in still another embodiment in a range of from about 45/40/15 to about 35/40/25.

The amount of grafting that takes place between the rubber phase and monomers comprising the rigid thermoplastic phase varies with the relative amount and composition of the rubber phase. In one embodiment, greater than about 10 wt % of the rigid thermoplastic phase is chemically grafted to the rubber, based on the total amount of rigid thermoplastic phase in the composition. In another embodiment, greater than about 15 wt % of the rigid thermoplastic phase is chemically grafted to the rubber, based on the total amount of rigid thermoplastic phase in the composition. In still another embodiment, greater than about 20 wt % of the rigid thermoplastic phase is chemically grafted to the rubber, based on the total amount of rigid thermoplastic phase in the composition.

In particular embodiments the amount of rigid thermoplastic phase chemically grafted to the rubber may be in a range of between about 5% and about 90 wt %; between about 10% and about 90 wt %; between about 15% and about 85 wt %; between about 15% and about 50 wt %; or between about 20% and about 50 wt %, based on the total amount of rigid thermoplastic phase in the composition. In yet other embodiments, about 40 to 90 wt % of the rigid thermoplastic phase is free, that is, non-grafted.

The rigid thermoplastic phase may be present in compositions of the invention in one embodiment at a level of from about 85 to about 6 percent by weight; in another embodiment at a level of from about 65 to about 6 percent by weight; in another embodiment at a level of from about 60 to about 20 percent by weight; in another embodiment at a level of from about 75 to about 40 percent by weight, and in still another embodiment at a level of from about 60 to about 50 percent by weight based on the total weight of the composition. In other embodiments rigid thermoplastic phase may be present in compositions of the invention in a range of between about 90% and about 30 wt %, based on the total weight of the composition.

The rigid thermoplastic phase may be formed solely by polymerization carried out in the presence of rubber substrate. This rigid thermoplastic phase, at least a portion of which is grafted to rubber substrate, is sometimes referred to herein after as a "first thermoplastic phase". Additionally, one or more separately polymerized rigid thermoplastic polymers that has been polymerized in the absence of the rubber substrate may be added to compositions of the invention. Said separately polymerized rigid thermoplastic polymer is conveniently referred to a "second thermoplastic phase" whether or not said second thermoplastic phase is partially or completely miscible or substantially immiscible with the first thermoplastic phase of which at least a portion is grafted to rubber substrate. The second rigid thermoplastic phase comprises a polymer with structural units derived from the same range of monomers as may be employed to prepare the polymer of the first thermoplastic phase. In some embodiments the second rigid thermoplastic phase comprises a polymer devoid of structural units derived from either of glycidyl methacrylate or maleic anhydride. When at least a portion of a second thermoplastic phase is added to compositions, then the amount of said second thermoplastic phase added is in a range of between about 20 wt. % and about 80 wt. %, or in a range of between about 30 wt. % and about 80 wt. %, or in a range of between about 30 wt. % and about 75 wt. %, or in a range of between about 40 wt. % and about 70 wt. % based on the weight of the entire composition.

Two or more different rubber substrates each possessing a different mean particle size may be separately employed in a polymerization reaction in which the first rigid thermoplastic phase is formed, and then the products blended together. In illustrative embodiments wherein such products each possessing a different mean particle size of initial rubber substrate are blended together, then the ratios of said substrates may be in a range of about 90:10 to about 10:90.

Any rigid thermoplastic phase may be made according to known processes, for example, mass polymerization, emulsion polymerization, suspension polymerization or combinations thereof, wherein at least a portion of the rigid thermoplastic phase is chemically bonded, i.e., "grafted" to the rubber phase via reaction with unsaturated sites present in the rubber phase. The grafting reaction may be performed in a batch, continuous or semi-continuous process. Representative procedures include, but are not limited to, those taught in U.S. Pat. No. 3,944,631; and U.S. patent application Ser. No. 08/962,458, filed Oct. 31, 1997. The unsaturated sites in the rubber phase are provided, for example, by residual unsaturated sites in those structural units of the rubber that were derived from a graftlinking monomer.

The compositions of the present invention can be formed into useful articles. In some embodiments the articles are unitary articles comprising a composition of the present invention. In other embodiments the articles may comprise a composition of the present invention in combination with at least one other resin, including, but not limited to, styrenic polymers and copolymers, SAN, ABS, poly(meth)acrylate polymers and copolymers; copolymers derived from at least one vinyl aromatic monomer, at least one monoethylenically unsaturated nitrile monomer, and at least one (meth)acrylate monomer; poly(vinyl chloride), poly(phenylene ether), polycarbonate, polyester, polyestercarbonate, polyetherimide, polyimide, polyamide, polyacetal, poly(phenylene sulfide), and polyolefin. Such combinations may comprise a blend of a composition of the present invention with at least one other resin, or a multilayer article comprising at least one layer comprising a composition of the present invention.

Multilayer and unitary articles which can be made which comprise compositions made by the method of the present invention include, but are not limited to, articles for outdoor vehicle and device (OVAD) applications; exterior and interior components for aircraft, automotive, truck, military vehicle (including automotive, aircraft, and water-borne vehicles), scooter, and motorcycle, including panels, quarter panels, rocker panels, vertical panels, horizontal panels, trim, pillars, center posts, fenders, doors, decklids, trunklids, hoods, bonnets, roofs, bumpers, fascia, grilles, mirror housings, pillar appliques, cladding, body side moldings, wheel covers, hubcaps, door handles, spoilers, window frames, headlamp bezels, tail lamp housings, tail lamp bezels, license plate enclosures, roof racks, and running boards; enclosures, housings, panels, and parts for outdoor vehicles and devices; enclosures for electrical and telecommunication devices; outdoor furniture; aircraft components; boats and marine equipment, including trim, enclosures, and housings; outboard motor housings; depth finder housings, personal water-craft; jet-skis; pools; spas; hot-tubs; steps; step coverings; building and construction applications such as glazing, fencing, decking planks, roofs; siding, particularly vinyl siding applications; windows, floors, decorative window furnishings or treatments; wall panels, and doors; outdoor and indoor signs; enclosures, housings, panels, and parts for automatic teller machines (ATM); enclosures, housings, panels, and parts for lawn and garden tractors, lawn mowers, and tools, including lawn and garden tools; window and door trim; sports equipment and toys; enclosures, housings, panels, and parts for snowmobiles; recreational vehicle panels and components; playground equipment; articles made from plastic-wood combinations; golf course markers; utility pit covers; mobile phone housings; radio sender housings; radio receiver housings; light fixtures; lighting appliances; reflectors; network interface device housings; transformer housings; air conditioner housings; cladding or seating for public transportation; cladding or seating for trains, subways, or buses; meter housings; antenna housings; cladding for satellite dishes; and like applications. The invention further contemplates additional fabrication operations on said articles, such as, but not limited to, molding, in-mold decoration, baking in a paint oven, plating, lamination, and/or thermoforming.

Any article comprising a composition of the present invention may optionally include additives known in the art including fillers (clay, talc, etc.), reinforcing agents (glass fibers), impact modifiers, plasticizers, flow promoters, lubricants and other processing aids, stabilizers, antioxidants, antistatic agents, colorants, mold release agents, flame retardants, UV screening agents, and the like. Said articles may be prepared by a variety of known processes such as, for example, profile extrusion, sheet extrusion, coextrusion, extrusion blow molding and thermoforming, and injection molding.

Without further elaboration, it is believed that one skilled in the art can, using the description herein, utilize the present invention to its fullest extent. The following examples are included to provide additional guidance to those skilled in the art in practicing the claimed invention. The examples provided are merely representative of the work that contributes to the teaching of the present application. Accordingly, these examples are not intended to limit the invention, as defined in the appended claims, in any manner. The abbreviation M-ASA means a methyl methacrylate-modified ASA resin, wherein methyl methacrylate-modified ASA resin means an ASA resin having a rigid thermoplastic phase comprising structural units derived from acrylonitrile, styrene, and methyl methacrylate.

EXAMPLE 1

Example 1 illustrates making a small-particle size M-ASA resin by an emulsion polymerization process.

Procedure 1A. Preparation of small-particle size poly(butyl acrylate) substrate latex: A stainless steel reactor equipped with a bladed turbine agitator was charged with 131 parts by weight (pbw) of demineralized water and 0.15 pbw of tetrasodium pyrophosphate. Agitation was begun and the reactor-contents were heated to 60° C. while purging the reactor contents with nitrogen for one hour. After purging was complete, 0.8 parts of sodium lauryl sulfate were added and agitated for 5 minutes; the nitrogen feed was changed from purging to blanketing.

The following feed streams were prepared for charging to the reactor: 89 pbw of butyl acrylate ("BA monomer"); a solution of 0.47 pbw of triallyl cyanurate in 10.53 pbw butyl acrylate ("TAC Solution"); an activator solution containing 0.132 pbw sodium formaldehyde sulfoxylate, 0.025 pbw of the monosodium salt of ethylenediaminetetraacetic acid (Na-HEDTA), 0.005 pbw ferrous sulfate heptahydrate and 15 pbw water ("Activator Solution"); 0.120 parts cumene hydroperoxide (CHP); and a surfactant solution containing 0.80 pbw of sodium lauryl sulfate (SLS) in 7.2 pbw of demineralized water ("Soap solution").

To begin the reaction, 6% of the total pbw of the BA monomer and TAC solution were batch charged to the reactor followed by 20% of the total activator solution. Then 6% of the total CHP charge was added to initiate polymerization, wherein an exothermic reaction was typically observed within 5 minutes of the CHP addition.

Thirty minutes after observation of the first exotherm was taken as time zero (T=0). The soap solution and remainder of the other feed streams were then fed according to the protocol in Table 1 from T=0 while maintaining the reaction at 60° C. The mean particle size of the resulting latex of poly(butyl acrylate) was measured by light scattering as 947 angstroms; the latex had an acetone gel content of 82% and a swelling index in acetone of 8.4.

TABLE 1

| Feed Stream | % of total parts charged | Time |
| --- | --- | --- |
| Soap Solution | 100% | 0-210 minutes |
| BA monomer | 94% | 35-210 minutes |

TABLE 1-continued

| Feed Stream | % of total parts charged | Time |
| --- | --- | --- |
| TAC Solution | 94% | 35-210 minutes |
| Activator Solution | 80% | 35-210 minutes |
| CHP | 94% | 35-210 minutes |

Procedure 1B. Preparation of small-particle size M-ASA graft copolymer: The graft copolymer of Example 1 was made by the aqueous emulsion polymerization of styrene, acrylonitrile and MMA monomers in the presence of the poly(butyl acrylate) rubber latex particles made by the process of Example 1A.

A stainless steel reactor with an agitator fitted with turbine blades was charged with 203 pbw water, and 45.0 pbw poly (butyl acrylate) rubber particles (in the form of an aqueous poly(butyl acrylate) rubber latex containing about 39 wt. % solids from Example 1A) and the contents of the reactor were heated to 60° C. The following feed charges were prepared: 22.00 pbw styrene; 8.25 pbw acrylonitrile; 24.75 pbw methyl methacrylate (MMA); 0.225 pbw cumene hydroperoxide; an activator solution containing 0.0033 pbw ferrous sulfate heptahydrate, 0.0165 pbw of the disodium salt of ethylenediaminetetraacetic acid ($Na_2EDTA$), 0.30 pbw sodium formaldehyde sulfoxylate (SFS) and 5 pbw water; and a soap solution containing 1.088 pbw SLS in 9.792 pbw demineralized water. These were each fed into the reactor at substantially uniform respective rates according to the protocol in Table 2:

TABLE 2

| Feed Time | Feed stream | Temperature |
| --- | --- | --- |
| 0-90 min | Styrene | 60° C. |
| 0-90 min | Acrylonitrile | 60° C. |
| 0-90 min | MMA | 60° C. |
| 0-90 min | Soap solution | 60° C. |
| 0-125 min | CHP, Activator solution | Ramp to 71° C. after 90 minutes |
| 125-170 min | All feeds off | 71° C. |
| Cool at 170 min | Cooling to 49° C. | Drop batch at 49° C. |

The reactor contents were then coagulated by the addition of 3 pbw calcium chloride per 100 pbw graft copolymer particles (dry basis) at a temperature of from 85 to 91° C. and then dried in a fluid bed dryer at an outlet air temperature of 74° C.

EXAMPLE 2

Example 2 illustrates making a large-particle-size M-ASA resin by an emulsion polymerization process of the present invention by following a seeded semi-batch polymerization process.

Procedure 2A. Preparation of poly(butyl acrylate) seed latex: The seed latex particles were produced by following the same recipe and polymerization conditions as Example 1A, except that 0.1 pbw of SLS was used in place of the 0.8 pbw SLS at the beginning of the reaction. The resulting latex polymer yielded a mean particle size of 1610 angstroms by light scattering.

Procedure 2B. Preparation of large-particle size poly(butyl acrylate) substrate latex: A stainless steel reactor equipped with a bladed turbine agitator was charged with 127.4 parts of demineralized water and 0.15 pbw of tetrasodium pyrophosphate. Agitation was begun and the reactor contents were heated to 60° C. while purging the reactor contents with nitrogen for one hour. After purging was complete, 2.5 pbw of the poly(butyl acrylate) seed polymer from Example 2A were added as the latex and agitated for 5 minutes; the nitrogen feed was changed from purging to blanketing.

The following feed streams were prepared for charging to the reactor: 85.75 pbw of butyl acrylate; a solution of 0.47 pbw of triallyl cyanurate in 11.28 pbw butyl acrylate ("TAC Solution"); an activator solution containing 0.132 pbw SFS, 0.025 pbw of NaHEDTA, 0.005 pbw ferrous sulfate heptahydrate and 15 pbw water ("Activator Solution"); 0.120 pbw cumene hydroperoxide (CHP); and a surfactant solution containing 0.4 pbw of SLS in 3.6 pbw of demineralized water ("Soap solution").

Once the reaction temperature was back to 60° C., 20% of the activator solution was batch charged to the reactor. Then all of the remaining monomer, soap and activator feeds to the reactor were started and fed over a period of 180 minutes. After all feeds had been charged, the reaction was held at 60° C. with agitation for 30 minutes, then cooled to 49° C. before dropping the batch.

The mean particle size of the resulting latex of poly(butyl acrylate) was measured by light scattering as 4261 angstroms and had an acetone gel content of 95% and a swelling index in acetone of 4.4.

Procedure 2C. Preparation of large-particle size M-ASA graft resin: The graft copolymer of Example 2 was made by the aqueous emulsion polymerization of styrene, acrylonitrile and MMA monomers in the presence of the poly(butyl acrylate) rubber latex particles made by the process of Example 2B while following the recipe and process described in Example 1, and isolating in the manner described in Example 1.

Comparative Resin C1: A small-particle size ASA graft copolymer was prepared by subjecting 45 pbw of the poly (butyl acrylate) substrate polymer of Example 1A to emulsion polymerization conditions as described in Example 1B using 36.67 pbw styrene and 18.33 pbw acrylonitrile as the graft monomers.

Comparative Resin C2: A large-particle size ASA graft copolymer was prepared by subjecting 45 pbw of the poly (butyl acrylate) substrate polymer of Example 2B to emulsion polymerization conditions as described in Example 2C using 36.67 pbw styrene and 18.33 pbw acrylonitrile as the graft monomers.

Comparative Resin C3: An ASA graft copolymer having a broad rubber particle size distribution was prepared by subjecting a poly(butyl acrylate) latex polymer as described in European patent application EP0913408 to graft polymerization with styrene and acrylonitrile. The poly(butyl acrylate) rubber latex particles were prepared according to the referenced continuous polymerization process using 0.47 pbw TAC in 99.53 pbw of butyl acrylate with 0.12 pbw CHP at 60° C. under conditions where the reactor residence time was 90 minutes. The ASA graft copolymer was prepared by subjecting 45 pbw of this continuously-polymerized poly(butyl acrylate) substrate polymer to emulsion polymerization conditions as described in Example 1B using 36.67 pbw styrene and 18.33 pbw acrylonitrile as the graft monomers and 0.275 parts per hundred parts resin pbw of CHP as initiator.

EXAMPLE 3-4 AND COMPARATIVE EXAMPLES C4-C8

The graft copolymers of Examples 1 and 2 and Comparative Examples C1, C2, and C3 were used as impact modifiers in the molding compositions of Examples 3 and 4, and Comparative Examples C4-C8 by combining the graft copolymers with the following resin components and additives in the relative amounts set forth below in Table 3 in parts by weight.

SAN-1 was styrene-acrylonitrile resin (72 pbw styrene/28 pbw acrylonitrile, based on 100 pbw copolymer and having a molecular weight of 103,000 g/mole) prepared by a bulk polymerization process. SAN-2 was styrene-acrylonitrile resin (73 pbw styrene/27 pbw acrylonitrile, based on 100 pbw copolymer and having a molecular weight of 105,000 g/mole) prepared by a suspension polymerization process. MMA-SAN-1 was a styrene-acrylonitrile-MMA resin (39.6 pbw styrene/15.4 pbw acrylonitrile/45.0 pbw MMA, based on 100 pbw copolymer and having a molecular weight of 90,000 g/mole) prepared by a bulk polymerization process. MMA-SAN-2 was a styrene-acrylonitrile-MMA resin (28 pbw styrene/24 pbw acrylonitrile/48 pbw MMA), prepared by a suspension polymerization process, sold as SR-06B by Ube Cycon Ltd. PMMA was V920A, a copolymer of MMA and ethyl acrylate obtained from AtoFina. Additives included UV stabilizers and antioxidants.

TABLE 3

| Polymer Component | C4 | C5 | C6 | C7 | Ex 3 | Ex 4 | C8 |
|---|---|---|---|---|---|---|---|
| SAN 1 | 40 | | 40 | | 40 | | 22 |
| SAN 2 | | 40 | | | | | |
| MMA-SAN 1 | | | | | | 40 | |
| MMA-SAN 2 | | | | 40 | | | |
| PMMA | | | | | | | 18 |
| Comparative Resin 1 | | | 45 | | | | |
| Comparative Resin 2 | | | 15 | | | | |
| Comparative Resin 3 | 60 | 60 | | 60 | | | |
| Example 1 | | | | | 45 | 45 | 45 |
| Example 2 | | | | | 15 | 15 | 15 |
| additives | 2.25 | 2.25 | 2.25 | 2.25 | 2.25 | 2.25 | 2.25 |
| TiO$_2$ | 5 | 5 | 5 | 5 | 5 | 5 | 5 |

Each of the molding compositions set forth in Table 3 was compounded either by using a twin screw extruder or a Banbury batch mixer at a stock temperature of approximately 232° C. Pellets of the compositions were molded at a stock temperature of 260° C. and a mold temperature of 66° C. to make specimens for testing.

Specimens molded from each of the compositions were subjected to Xenon arc accelerated weathering using inner and outer borosilicate filters according to ISO 4892A. Color shift was measured on the CIELAB L, a and b scale using a Hunter Colorimeter for color measurement. Yellowing of these white pigmented samples after exposure are reported as a "delta b" value, with a higher (positive) value of delta b indicating a more pronounced color shift towards yellow, with a difference of 0.5 delta b unit or greater being considered as a significant color shift. These results are set forth in Table 4 as Delta b versus cumulative exposure, expressed in kilojoules per square meter (kJ/m$^2$) exposure at a wavelength of 340 nm. The results for yellowing are often difficult to interpret in the case of styrenic polymers because there are two competing reactions underway: the bleaching of color bodies formed during thermal processing and the photoyellowing being induced by UV exposure. Thus for the conventional ASA sample the delta b value may at first go negative (more blue) due to bleaching, then go positive as the photoyellowing reaction begins to dominate.

TABLE 4

Delta b versus cumulative exposure

| Exposure, kJ/m² | C4 | C5 | C6 | C7 | Ex. 3 | Ex. 4 | C8 |
|---|---|---|---|---|---|---|---|
| 0 | 0 | 0 | 0 | 0 | 0 | 0 | 0 |
| 640 | −2.73 | −4.31 | −3.92 | −5.03 | −2.3 | −2.2 | −1.92 |
| 1301 | −1.18 | −4.04 | −3.79 | −5.18 | −2.34 | −2.26 | −1.99 |
| 2512 | 2.63 | −1.72 | −2.34 | −4.77 | −2.08 | −2.07 | −1.87 |
| 5091 | 0.38 | −1.84 | −1.68 | −4.21 | −1.71 | −2.14 | −1.86 |
| 7783 | 0.77 | −2.39 | −2.04 | −4.16 | −0.91 | −2.03 | −1.66 |
| 10005 | 1.35 | −2.05 | −2.47 | −4.42 | −1.08 | −1.96 | −1.45 |

The surface gloss was also recorded as a function of exposure. The ability to retain the initial gloss of a molded article is one important factor in the acceptance of a product as a weatherable material. Gloss properties at 60° were measured for the test specimens according to ASTM D523. Results for gloss retention are set forth in Table 5 as gloss versus cumulative exposure, expressed in kilojoules per square meter ("kJ/m²") exposure at a wavelength of 340 nm.

TABLE 5

Gloss versus cumulative exposure

| Exposure, kJ/m² | C4 | C5 | C6 | C7 | Ex. 3 | Ex. 4 | C8 |
|---|---|---|---|---|---|---|---|
| 0 | 94.5 | 92 | 98.1 | 92 | 96.3 | 94 | 94.4 |
| 640 | 74.6 | 90.9 | 96.5 | 89.7 | 97.1 | 93.6 | 93.3 |
| 1301 | 56.8 | 84 | 94.8 | 81.8 | 95.2 | 91.5 | 91.1 |
| 2512 | 41.3 | 56.1 | 86.8 | 67.5 | 92.8 | 89.7 | 90.9 |
| 5092 | 2.9 | 2.8 | 21.6 | 12.3 | 74.9 | 88.5 | 88.7 |
| 7783 | 2.5 | 2.4 | 4.4 | 2.5 | 20.5 | 83.8 | 85.2 |
| 10005 | 2.4 | 2.4 | 2.7 | 2.5 | 7.3 | 80.2 | 77.9 |

Comparative Examples C4 through C7, all prepared with conventional ASA resins as impact modifiers, show relatively poor gloss retention performance with loss of substantially all of the initial high gloss by 5,000 kJ/m² exposure or equivalent to roughly 2 years outdoor exposure. Remarkably, the gloss retention in Comparative Example C7 containing MMASAN rigid phase is no better than that of Comparative Example C5 containing SAN rigid phase. Example 3 shows that a blend of the present invention combining a MMA-modified ASA resin with SAN can double the useful life of the article with respect to gloss retention. Example 4 wherein MMA monomer is incorporated into both the graft resin and the rigid matrix polymer shows improvement in gloss retention and compares well with Comparative Example 8 where a MMA-modified ASA resin was combined with a blend of PMMA and SAN.

Specimens molded from the compositions were also subjected to physical testing. The notched Izod impact performance of the compositions was tested at room temperature according to ASTM D256. The falling dart impact properties were measured using an instrumented impact apparatus (Dynatup) with a 0.5 inch diameter dart. Heat deflection temperature (HDT) was measured at 0.455 megapascals (MPa) (66 pounds per square inch) and 1.82 MPa (264 pounds per square inch) fiber stress according to ASTM D648. The melt viscosity of each of the compositions was measured using a Kayeness capillary rheometer under conditions of 260° C. melt temperature and apparent shear rate of 1,000 reciprocal seconds. Results of the tests are set forth below for Examples 3 and 4 and Comparative Examples C6 and C8, in Table 6.

TABLE 6

| Property | C6 | Ex. 3 | Ex. 4 | C8 |
|---|---|---|---|---|
| RT Notched Izod, joules/m | 176 | 117 | 91 | 107 |
| Dynatup total energy, joules | 43.5 | 27.8 | 28.1 | 13.4 |
| HDT, ° C., 0.455 MPa | 91.2 | 88.6 | 82.2 | 86.2 |
| HDT, ° C., 1.82 MPa | 80.1 | 77.7 | 73.3 | 76.2 |
| Viscosity Pa · s | 1649 | 1300 | 1229 | 1318 |

Example 4 was found to have a loss in heat deflection temperature versus the conventional ASA of Comparative Example 6. It also exhibited a decrease in notched Izod impact strength. Example 3 which incorporates the MMA monomer into the grafted ASA alone retains substantially all of the heat resistance of a conventional ASA such as Comparative Example 6 while offering improved weathering. Example 3 exhibits superior properties to Comparative Example 8, which uses a blend of MMA-modified ASA resin with PMMA and SAN. Thus the combination of a M-ASA high rubber graft resin with a SAN matrix polymer delivers significant improvement in color shift and gloss retention while at the same time minimizing the loss in HDT which may accompany use of a MMASAN resin composition in both rigid phase and rubber phase of the blend.

EXAMPLE 5 AND COMPARATIVE EXAMPLE 9

Comparative Example 9 was a composition containing SAN (2:1 S:AN) grafted to PBA as the rubber phase and conventional SAN as the rigid thermoplastic phase, along with conventional additives including 2 phr carbon black. The formulation of the invention used the same pigment and stabilizer package but comprised a blend of MMASAN rigid phase in place of SAN and a grafted rubber with bimodal particle size distribution having 75% of the PBA rubber particles at 100 nm and 25% of the rubber particles at 450 nm; these rubbers were grafted with a MMASAN composition of 45 MMA, 39.6 styrene, 15.4 AN to match that of the MMASAN rigid phase. Test specimens were molded of each formulation. Details of the formulations with amounts in parts by weight and resulting physical properties, measured as for those in Table 6, are shown in Table 7. The abbreviation PS indicates mean particle size.

TABLE 7

| Components in parts | C9 | Ex. 5 |
|---|---|---|
| SAN | 40 | |
| ASA (45% BA) | 60 | |
| Bulk MMASAN | | 40 |
| M-ASA (100 nm PS) | | 45 |
| M-ASA (450 nm PS) | | 15 |
| Additives/colorants | 4.55 | 4.55 |
| RT Notched Izod, joules/m | 442 | 112 |
| Flex. Modulus, MPa | 1821 | 2403 |
| Flexural stress at yield, MPa | 55 | 65 |
| HDT, ° C., 0.455 MPa | 89 | 83 |
| Dynatup total energy, joules | 42.6 | 15.6 |
| MFI, grams/10 minutes at 220° C./10 kg. | 6.3 | 19.0 |
| Viscosity, Pa · s | 2185 | 1272 |
| L* specular excluded (jetness) | 11.1 | 7.7 |

The resulting physical property profile for the experimental blend based on the bimodal M-ASA and MMASAN rigid is one of higher stiffness and flow and yet still a reasonable level of impact strength compared to Comparative Example 9. The depth of black color or "jetness" of the experimental formulation is also superior, as seen in the lower L* value when measured with the specular component excluded.

Figure 1:
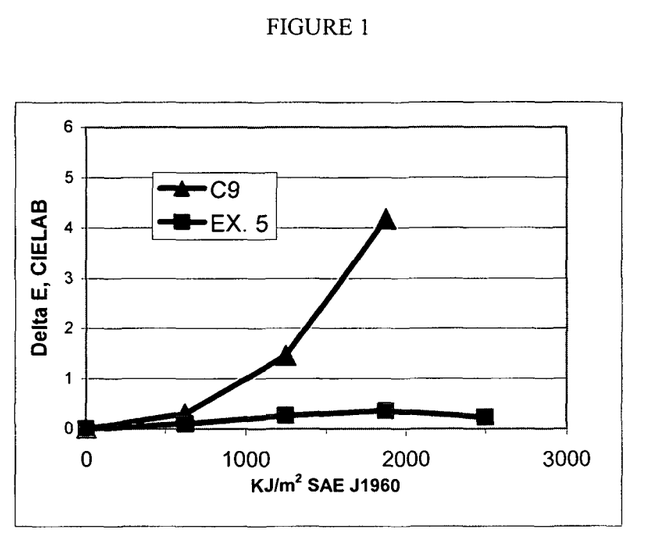
FIG. 1 shows the results of color retention measured as a function of exposure in Xenon Arc accelerated weathering for Example 5 and Comparative Example 9.
Figure 2:
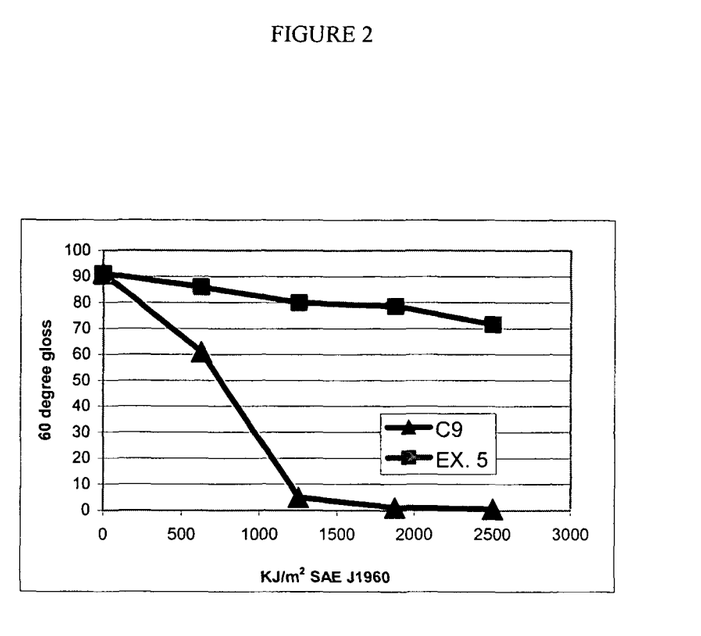
FIG. 2 shows the results of surface gloss retention measured as a function of exposure in Xenon Arc accelerated weathering for Example 5 and Comparative Example 9.

Color chips of these two formulations were exposed to Xenon Arc accelerated weathering under the SAE J1960 protocol through 2500 kJ/m2 (measured at 340 nm) exposure. FIG. 1 shows the results of color retention measured as a function of exposure (CIELAB Delta E versus cumulative exposure in kilojoules per square meter). FIG. 2 shows the results of surface gloss retention measured as a function of exposure in kilojoules per square meter. Gloss properties at 600 were measured according to ASTM D523. The Figures show outstanding performance for the experimental MMA-modified formulation in both color and gloss retention relative to the Comparative Example.

While the invention has been illustrated and described in typical embodiments, it is not intended to be limited to the details shown, since various modifications and substitutions can be made without departing in any way from the spirit of the present invention. As such, further modifications and equivalents of the invention herein disclosed may occur to persons skilled in the art using no more than routine experimentation, and all such modifications and equivalents are believed to be within the spirit and scope of the invention as defined by the following claims. All Patents and Patent Applications cited herein are incorporated herein by reference.

The invention claimed is:

1. A rubber modified thermoplastic resin composition comprising a discontinuous elastomeric phase, wherein the elastomeric phase is present in an amount of 40 to 94 wt %, based on the total weight of the composition and comprises a polymer having structural units derived from at least one $(C_1-C_{12})$alkyl(meth)acrylate monomer and is dispersed in a rigid thermoplastic phase, wherein 5 wt. % to 90 wt. % of the rigid thermoplastic phase is chemically grafted to the elastomeric phase, based on the total amount of rigid thermoplastic phase in the composition, and wherein said thermoplastic phase comprises structural units derived from at least one vinyl aromatic monomer, at least one monoethylenically unsaturated nitrile monomer and at least one $(C_1-C_{12})$alkyl- or aryl-(meth)acrylate monomer; where the amount of the vinyl aromatic monomer in the rigid phase is 20 to 60 wt %, where the amount of the monoethylenically unsaturated nitrile monomer in the rigid phase is 10 to 25 wt %, and wherein the elastomeric phase has a bimodal particle size distribution; wherein the elastomeric phase comprises a first mean particle size of less than 160 nm and a second mean particle size in a range of between 200 nm and 750 nm.

2. The composition of claim 1, further comprising a second thermoplastic phase prepared separately in the absence of the elastomeric phase and added to the composition, wherein said second thermoplastic phase comprises structural units derived from at least one vinyl aromatic monomer and at least one monoethylenically unsaturated nitrile monomer.

3. The composition of claim 1, where the at least one $(C_1-C_{12})$alkyl monomer is butyl acrylate.

4. The composition of claim 1, wherein the polymer of the elastomeric phase further comprises structural units derived from at least one polyethylenically unsaturated monomer.

5. The composition of claim 4, wherein the polyethylenically unsaturated monomer is selected from the group consisting of butylene diacrylate, divinyl benzene, butane diol dimethacrylate, trimethylolpropane tri(meth)acrylate, allyl methacrylate, diallyl methacrylate, diallyl maleate, diallyl fumarate, diallyl phthalate, triallyl methacrylate, triallylisocyanurate, the acrylate of tricyclodecenylalcohol and mixtures thereof.

6. The composition of claim 4, wherein between 10 to 90 wt % of the rigid thermoplastic phase is chemically grafted to the elastomeric phase, based on the total amount of rigid thermoplastic phase in the composition.

7. The composition of claim 4, wherein 40 to 90 wt. % of the rigid thermoplastic phase is not grafted to the elastomeric phase, based on the total amount of rigid thermoplastic phase in the composition.

8. The composition of claim 4, wherein said thermoplastic phase comprises structural units derived from methyl methacrylate and either styrene and acrylonitrile, or alpha-methyl styrene and acrylonitrile or a mixture of styrene, alpha-methyl styrene and acrylonitrile.

9. The composition of claim 4, comprising a second thermoplastic phase prepared separately in the absence of the elastomeric phase and added to the composition, wherein said first thermoplastic phase comprises structural units derived from methyl methacrylate and either styrene and acrylonitrile, or alpha-methyl styrene and acrylonitrile or a mixture of styrene, alpha-methyl styrene and acrylonitrile; and wherein said second thermoplastic phase comprises structural units derived from either styrene and acrylonitrile, or alpha-methyl styrene and acrylonitrile or a mixture of styrene, alpha-methyl styrene and acrylonitrile; and wherein said elastomeric phase is essentially free of structural units derived from monoethylenically unsaturated carboxylic acids.

10. The composition of claim 4, wherein the thermoplastic phase comprises structural units derived from methyl methacrylate, styrene, and acrylonitrile; methyl methacrylate, alpha-methylstyrene, and acrylonitrile; or styrene, alpha-methylstyrene and acrylonitrile.

* * * * *